Sept. 4, 1928.
L. F. NIELSEN
1,682,927
PULLEY ATTACHMENT
Filed May 9, 1921
2 Sheets-Sheet 1
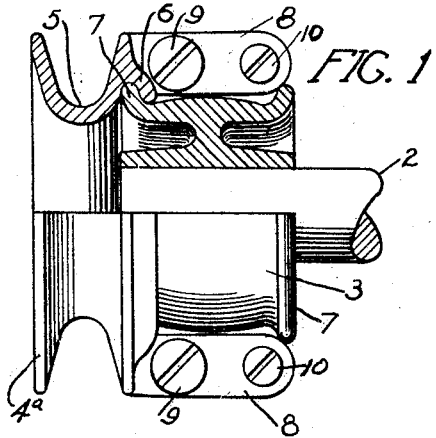
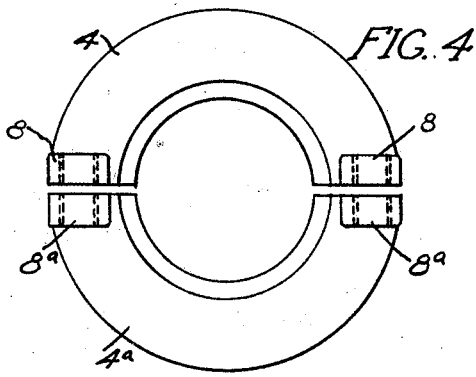
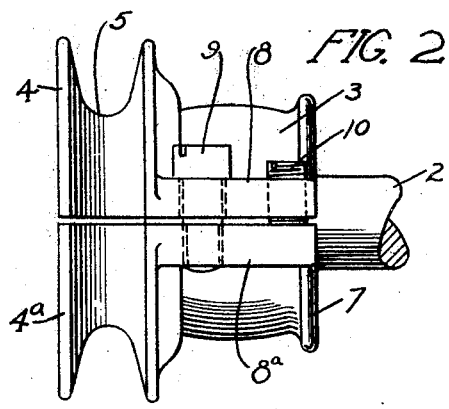
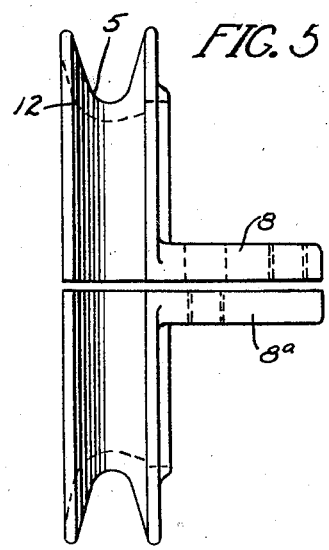
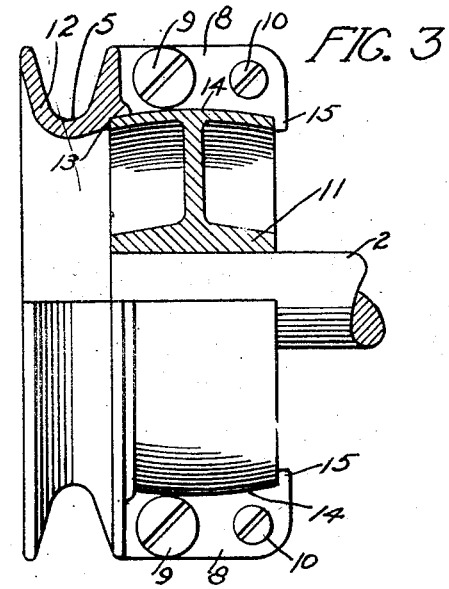
INVENTOR
LAURITZ F. NIELSEN
BY
Paul & Paul
His Attorneys Sept. 4, 1928.
L. F. NIELSEN
1,682,927
PULLEY ATTACHMENT
Filed May 9, 1921
2 Sheets-Sheet 2
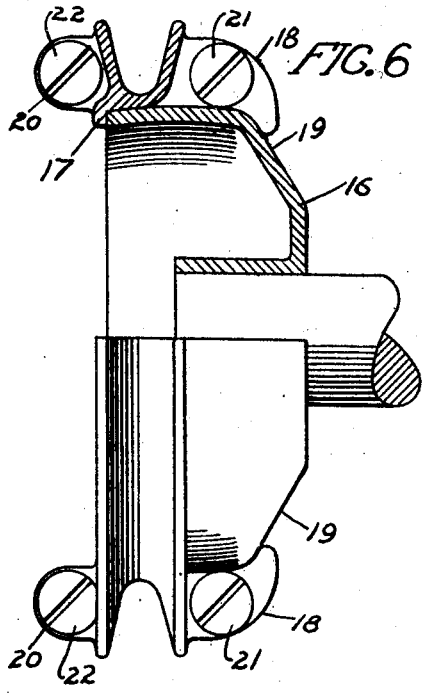
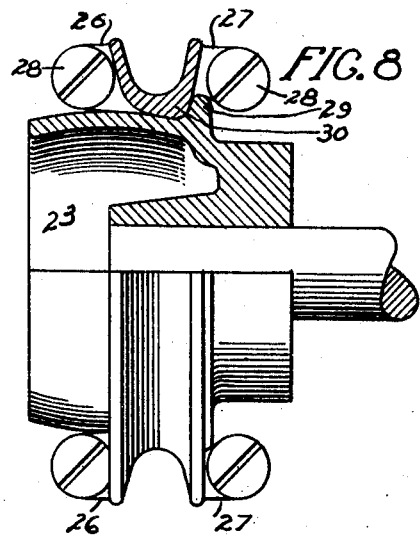
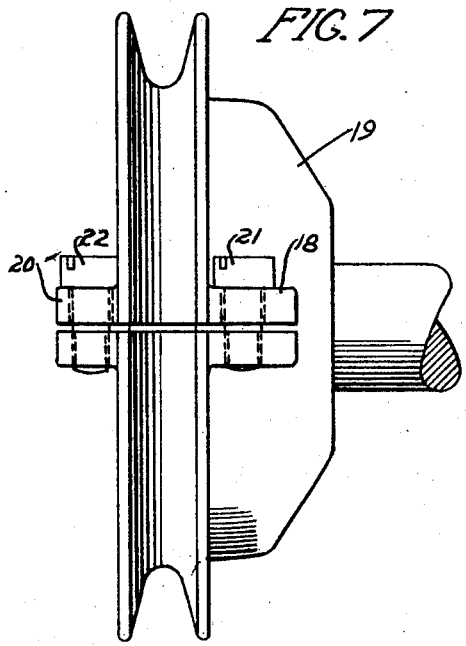
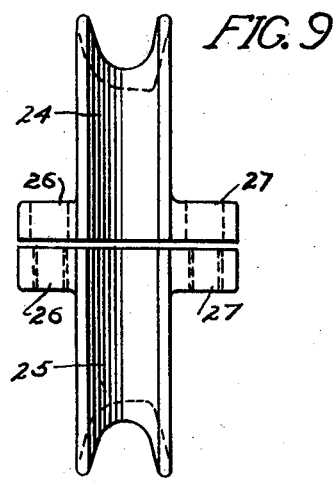
INVENTOR
LAURITZ F. NIELSEN
BY Paul Paul
His Attorneys Patented Sept. 4, 1928.

1,682,927

UNITED STATES PATENT OFFICE.

LAURITZ F. NIELSEN, OF MINNEAPOLIS, MINNESOTA, ASSIGNOR TO DURKEE-ATWOOD COMPANY, OF MINNEAPOLIS, MINNESOTA, A CORPORATION OF MINNESOTA.

PULLEY ATTACHMENT.

Application filed May 9, 1921. Serial No. 467,909.

The object of my invention is to provide an attachment for a pulley which will adapt a pulley intended for use with a flat belt for service with a round belt or one that is circular in cross section, thus eliminating the necessity of discarding a pulley which may be in perfect condition when the user desires to put on a different form of belt from that for which the pulley was originally intended.

The invention consists generally in various constructions and combinations, all as hereinafter described and particularly pointed out in the claims.

In the accompanying drawings forming part of this specification,

Figure 1 is a view, partially in section, of a pulley with my invention applied thereto, Figure 2 is a top view of the same, Figure 3 is a view corresponding to Figure 1, showing a different form of pulley, Figure 4 is a side view of the attachment, as shown in Figures 1 and 2, Figure 5 is an edge view of the device removed from the pulley, Figure 6 illustrates the attachment applied to a cone pulley, shown partially in section, Figure 7 is a top view, Figure 8 illustrates still another type of pulley with my attachment mounted thereon, Figure 9 is a view of the attachment separated from the pulley.

In the drawing, 2 represents a shaft, 3 a hollow faced pulley secured thereon and adapted for use with a flat belt, for such work as transmitting power to the fan of a gas engine. It is often desirable to substitute another form of belt in place of the one for which the pulley was intended. My attachment comprises a hub formed in two sections, 4 and 4ª, having a hollow or concave face 5 fashioned to receive a belt, circular in cross section and provided with a flange 6 which engages the flanged edge 7 of the pulley shown in Figures 1 and 2. The sections 4 and 4ª of the attachment are also provided with arms 8 and 8ª upon opposite sides of the pulleys, said arms being arranged in pairs in opposing relation and connected by screws 9 which are tapped transversely through the arms. One arm on each side is also provided with a threaded plug 10 that is tapped into one arm and bears on the opposing surface of the adjacent arm for the purpose of rocking the attachment sections and clamping the flange of the pulley rigidly between these sections. Thus when the attachment is mounted on a pulley, space will be provided between them, as indicated in Figure 2, and then when the plug 10 is tightened or moved in engagement with the opposing arm, the sections of the attachment will be rocked sufficiently to clamp the pulley flange and be rigidly held thereon.

In Figure 3 another form of pulley 11 is shown, having a convex face, and the attachment 12 has a recess 13 to receive the edge of the pulley on one side. Arms similar to those described are arranged to bear on the periphery of the pulley and clamp the sections firmly thereon. These arms have curved faces 14 to fit the surface of the pulley and lugs 15 which project inwardly past the edge of the pulley and co-operate with the shoulders 13 to lock the attachment rigidly on the pulley.

In Figure 6 a pulley 16 is shown and the attachment has lugs 17 for bearing on one edge of the pulley and arms 18 formed to fit the surface of the pulley and extending down an inclined surface 19 on the opposite side of the pulley from the lug 17. Wings 20 are provided adjacent the lug 17 and screws 21 and 22 secure the arm 18 and wing 20 of one member to the corresponding arm and wing of the other member. These screws, when tightened, draw the opposing sections of the attachment snugly together and their disengagement from the pulley is prevented by the bearing of the lug 17 and the arm 18 thereon.

In Figure 8 another form of pulley 23 is shown and an attachment composed of sections 24 and 25 having lugs 26 and 27 arranged in pairs and secured together by screws 28. The pulley has a flange 29 on one end and the sections of the attachment have an annular shoulder 30 which fits against the flange 29 and is seated snugly in the angle between the face of the pulley and the flange so that when the screws 28 are tightened, the attachment will be rigidly locked on the pulley. The attachment will have a hollow or concave face to adapt it for receiving a belt that is round or circular in cross section.

By means of this attachment a pulley originally intended for use with a flat belt may be easily adapted for use with a round belt, so called, or one that is circular in cross section. Thus it becomes unnecessary to discard a pulley when it is desired to use a belt thereon different from the one for which the pulley was intended.

I claim as my invention:

1. The combination, with a pulley having a flanged edge, of an attachment composed of separable sections having a flange for engaging the edge of the pulley, the sections of said attachment having arms thereon to extend across the peripheral face of the pulley in opposing relation, screws passing through said arms for locking them together, and means for rocking one of said sections on the other to clamp it on the pulley.

2. The combination, with a pulley, of an attachment composed of separable sections mounted thereon, said attachments having means for engaging the edge of the pulley and the sections of said attachment having arms extending across the peripheral face of the pulley in opposing relation, screws for locking said arms together and studs passing through one of said arms and engaging the opposite arm for rocking said sections on their connecting means and clamping them on the pulley.

3. The combination with a pulley having a peripheral face adapted to receive a flat belt, of an attachment comprising a pulley formed with a grooved-face adapted to receive a belt circular in cross section and members extending laterally from the pulley parallel with its axis and adapted to rest on the peripheral face of the flat-belt pulley to support the grooved-face pulley at one end thereof, and means for locking the attachment to the flat faced pulley.

4. The combination, with a pulley having a peripheral face adapted for a flat belt, of a pulley attachment comprising a hub formed in two sections having a concave face fashioned to receive a round belt and having means for engaging the surface of the pulley, said sections having arms projecting upon opposite sides of the pulley and arranged in pairs in opposing relation and screws tapped transversely through said arms one arm of each pair having a plug mounted therein and adapted to bear on the opposing surface of the adjacent arm, movement of said plug against the opposite arm rocking the attachment sections one upon the other and clamping them on the face of the pulley.

5. The combination, with a pulley, of an attachment composed of transversely separable sections having means to engage an edge of the pulley and provided with a concave surface to receive a round belt, the sections of said attachment having arms projecting therefrom parallel to its axis and screws passing through said arms transversely of the axis of the pulley for clamping the attachment sections on the edge of the pulley.

In witness whereof, I have hereunto set my hand this 3d day of May, 1921.

LAURITZ F. NIELSEN.